United States Patent [19]
Kremer et al.

[11] Patent Number: 5,419,603
[45] Date of Patent: May 30, 1995

[54] CARGO BED LINER TIE-DOWN FASTENER ENCLOSURE

[75] Inventors: Richard J. Kremer; Stephen R. Wood, both of Bloomingdale, Ind.

[73] Assignee: Futurex Industries, Inc., Marshall, Ind.

[21] Appl. No.: 107,947

[22] Filed: Aug. 16, 1993

[51] Int. Cl.$^6$ ............................................. B62D 33/00
[52] U.S. Cl. .......................... 296/39.2; 24/265 CD; 410/109; 410/112
[58] Field of Search ............... 410/102, 106, 108, 109, 410/110, 112, 113, 114, 116; 296/39.1, 39.2; 248/499; 24/68 CD, 265 CD, 115 K

[56] References Cited

U.S. PATENT DOCUMENTS

| | | | |
|---|---|---|---|
| 2,660,130 | 11/1953 | Johnson | 410/112 |
| 3,421,726 | 1/1969 | Getter | 248/361 |
| 3,694,866 | 10/1972 | Maier | 410/112 X |
| 3,814,461 | 6/1974 | Rhody | 410/108 |
| 3,842,755 | 10/1974 | Carr | 410/113 |
| 3,893,399 | 7/1975 | Lewis et al. | 410/112 |
| 4,161,335 | 7/1979 | Nix et al. | 296/39.2 |
| 4,253,785 | 3/1981 | Bronstein | 410/110 |
| 4,648,765 | 3/1987 | Kovaleski et al. | 410/110 |
| 4,659,133 | 4/1987 | Gower | 296/39 R |
| 4,915,556 | 4/1990 | Unger | 410/110 |
| 4,936,724 | 6/1990 | Dutton | 410/110 |
| 4,993,343 | 2/1991 | Czipri | 410/112 X |
| 5,004,388 | 4/1991 | Harris | 410/107 |
| 5,052,869 | 10/1991 | Hansen, II | 410/111 |
| 5,100,193 | 3/1992 | Oprea et al. | 296/39.2 |
| 5,131,709 | 7/1992 | Spica | 296/39.2 |
| 5,141,277 | 8/1992 | Alexander | 296/43 |
| 5,221,119 | 6/1993 | Emeay | 296/39.2 |

Primary Examiner—Michael S. Huppert
Assistant Examiner—Stephen Gordon
Attorney, Agent, or Firm—Ice Miller Donadio & Ryan; Paul B. Overhauser; Doreen J. Gridley

[57] ABSTRACT

An enclosure for use with a cargo bed liner providing access to a tie-down fastener attached to the cargo bed. The liner with which the enclosure is used includes a wall portion having a hole therein. The liner wall is aligned in relation to the cargo bed wall such that the fastener is accessible through the hole in the liner wall when the liner is installed. The enclosure includes a casing used for insertion into the hole in the liner wall. The casing also includes as least one aperture for the receipt of the fastener and an open portion sized to be substantially coincident with the hole in the liner wall when the casing is inserted through the hole. In this manner, access is provided to the fastener through the open portion of the casing. Also included as part of the enclosure is a flanged portion having an opening therethrough. The flanged portion is connected to the casing adjacent the open portion of the casing such that the opening of the flanged portion is substantially coincident with the open portion of the casing and the hole in the liner. The enclosure of the present invention allows one to utilize the tie-down fasteners attached to the cargo bed while protecting the cargo bed with a cargo bed liner. Further, the enclosure may be used in lieu of retainers ordinarily employed to hold the liner in the proper position relative to the cargo bed.

10 Claims, 3 Drawing Sheets

CARGO BED LINER TIE-DOWN FASTENER ENCLOSURE

BACKGROUND OF THE INVENTION

This invention relates to cargo bed liners, and, in particular, to the provision of a fastener enclosure for use with a cargo bed liner providing access to tie-down fasteners affixed to the cargo bed.

Many cargo beds, such as truck beds, carts and trailers, are equipped with tie-down fasteners (clamps, cleats, hooks, eye-bolts, etc.) for use in securing items within the cargo bed. These tie-down fasteners may be an integral part of the cargo bed or may be factory installed. Optionally, the consumer may install tie-down fasteners directly onto the cargo bed. For example, the tie-down assemblies of U.S. Pat. Nos. 4,648,765 and 5,052,869 may be installed onto a wall of the cargo bed. The tie-down fasteners of U.S. Pat. Nos. 3,421,726 and 4,915,556 may be installed in the cargo bed's stake pocket (a recess usually formed in the top of the cargo bed's side walls for insertion of a stake or post therein).

In many instances, it is desired by the consumer to protect the cargo bed by installing a protective liner. Many types of liners are commercially available for covering various surfaces of the cargo bed and may be comprised of plastic, wood, vinyl or other materials. By covering the bottom surface, side walls, end walls, and tailgate (where applicable) of the liner, items transported in the cargo bed are less likely to damage the cargo bed. Further, the liners protect the cargo bed from environmental elements, such as moisture damage.

A problem occurs, however, should the consumer desire to protect the cargo bed with such a liner and also wish to use the tie-down fasteners attached to the cargo bed for securing cargo therein. Because the fasteners connected to the cargo bed become covered by the liner when the liner is installed, the fasteners are rendered inaccessible. Thus, to provide access to the tie-down fasteners, consumers and manufacturers have been known to cut large holes into the liner near the fasteners. Not only are these holes unsightly, they also allow water, dirt and other contaminants to become disposed between the cargo bed and the liner. Such an infusion of water or contaminants may result in damage to the cargo bed by moisture or by chemical reactions with the cargo bed, thereby defeating one of the very purposes for which the liner was installed. It is also difficult for the consumer to reach through the hole cut in the liner to access the fastener. It is therefore desired to provide an aesthetically pleasing attachment for use with a cargo bed liner providing easy access to tie-down fasteners connected to the cargo bed, and limiting or eliminating the possibility of damage to the cargo bed by the passage of water or contaminants between the liner and the cargo bed.

Because some liners extend over the top of the cargo bed's side walls, stake pockets, like tie-down fasteners, become inaccessible when such a liner is used. U.S. Pat. No. 5,141,277 discloses a stake pocket insert to be used with a cargo bed liner providing access to the stake pocket when covered by a cargo bed liner. The stake pocket insert may be used with stake pockets of various sizes and is formed as a pocket so that the insert may serve the same purpose as the original stake pocket. A tie-down fastener may also be provided with the insert. This invention addresses the problem of the inaccessibility of the stake pockets upon installation of a cargo bed liner covering the stake pockets, but does not address the problem of inaccessibility of tie-down fasteners connected to the cargo bed caused by the installation of such a liner over the wall. Generally, these fasteners are located on the cargo bed's side and end walls or at the junction between adjoining walls.

The installation of a cargo bed liner usually requires the use of retainers to connect the liner to the cargo bed so that the liner is held firmly in place. Numerous types of fasteners, including screws and clamps, are used as retainers. Two embodiments of retainers are disclosed, for example, in U.S. Pat. No. 4,659,133.

For instances in which tie-down fasteners are provided or are available for installation directly on the cargo bed, because the liner renders these fasteners as inaccessible, the fasteners are not currently utilized to secure the liner to the cargo bed. Rather, retainers as previously discussed are used for this purpose. Just as the stake pocket insert of U.S. Pat. No. 5,141,277 may serve to hold the liner in its desired position relative to the cargo bed, it is desired to reduce manufacturing costs and costs to the consumer for a cargo bed liner by taking advantage of the available tie-down fasteners on the cargo bed to serve as means for securing the liner to the cargo bed, thereby eliminating the need to provide retainers.

SUMMARY OF THE INVENTION

The present invention provides an enclosure to be used with a cargo bed liner providing access to tie-down fasteners attached to the cargo bed which would ordinarily be rendered inaccessible by the installation of the liner.

The invention comprises, in one form thereof, a fastener enclosure for a tie-down fastener attached to a cargo bed. The enclosure is used with a cargo bed liner which comprises a wall portion which substantially covers a cargo bed wall about the fastener and has a hole therein providing access to the fastener through the liner. When the liner is installed in the cargo bed, the liner is aligned such that the fastener is accessible through the hole in the liner wall. The enclosure comprises a casing sized for insertion through the liner wall hole and has at least one aperture therethrough for receipt of the fastener. The casing also includes an open portion sized to be substantially coincident with the hole in the liner wall when the casing is inserted through the hole. Access is thus provided to the fastener through the open portion of the casing. The enclosure also includes a flanged portion having an opening therethrough. The flanged portion is connected to the casing adjacent the open portion of the casing such that the opening is substantially coincident with the open portion of the casing.

In another form thereof, the invention comprises a cargo bed liner including the fastener enclosure of the present invention. More than one such enclosure may be included as a part of the cargo bed liner and the enclosure may be located on any liner surface, including the junction between adjacent liner walls.

An advantage of the present invention is the provision of an aesthetically pleasing attachment to be used with a cargo bed liner to allow the consumer to access and utilize the tie-down fasteners connected to the cargo bed.

Another advantage is the provision of an attachment which limits or eliminates the possibility of damage to the cargo bed by not permitting water or contaminants which are known to damage the cargo bed to enter the gap between the liner and the cargo bed.

Yet another advantage is the provision of such an attachment which also serves as means for securing the liner to the cargo bed and thereby eliminates the need for retainers for this purpose.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENTS

Figure 1:
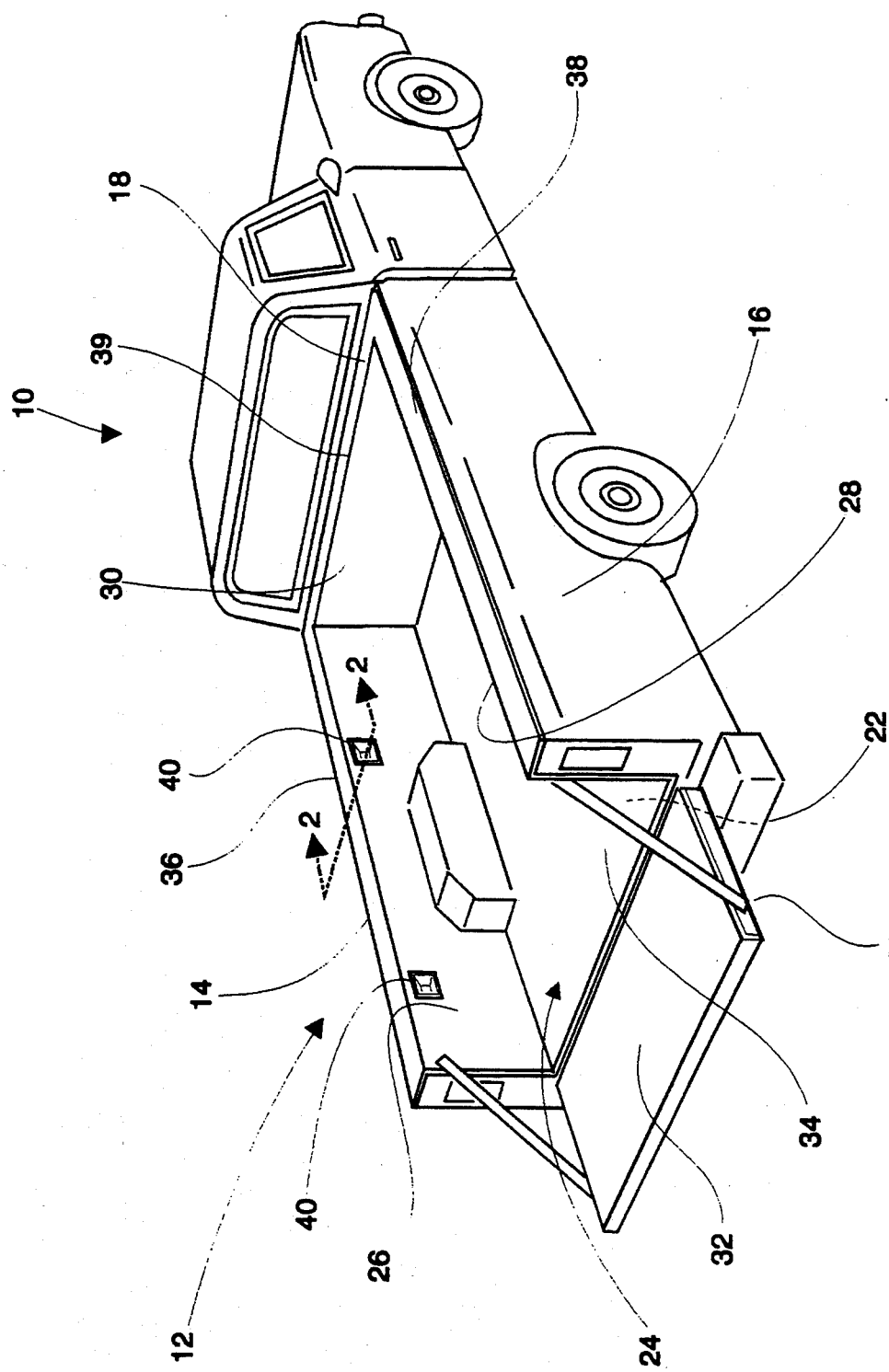
FIG. 1 shows a perspective view of one embodiment of the tie-down fastener enclosure according to the present invention which is installed on a cargo bed liner covering the cargo bed of a truck.

Accordingly, referring now to FIG. 1, there is shown a perspective view of one embodiment of the tie-down fastener enclosure according to the present invention which is installed on a cargo bed liner covering the cargo bed of a truck. Illustrated is truck 10 having cargo bed 12. Cargo bed 12 includes first side wall 14, second side wall 16, front wall 18, pivotable tailgate 20, and bottom surface 22. Disposed within cargo bed 12 is cargo bed liner 24 which substantially covers all the interior surfaces of cargo bed 12. Specifically, cargo bed liner 24 includes first liner side wall 26, second liner side wall 28, front liner wall 30, tailgate liner 32, and liner bottom surface 34 for substantially covering the respective surfaces of cargo bed 12. In a preferred embodiment, first and second liner walls 26 and 28, front liner wall 30, and bottom liner surface 34 are constructed a unitary piece of ABS plastic; however, liner 24 may be made of other materials such as plastic, wood, or vinyl, and the liner surfaces and walls may be separate pieces. In the embodiment of FIG. 1, liner 24 also includes first, second and third wall ledges 36, 38 and 39 disposed above the top surfaces of first and second cargo bed side walls 14 and 16, and front cargo bed wall 18, respectively. Two tie-down fastener enclosures 40 according to the present invention as described in further detail herein are disposed in first liner side wall 26. Similarly, two tie-down fastener enclosures (not shown) are disposed in second liner side wall 28.

Figure 2:
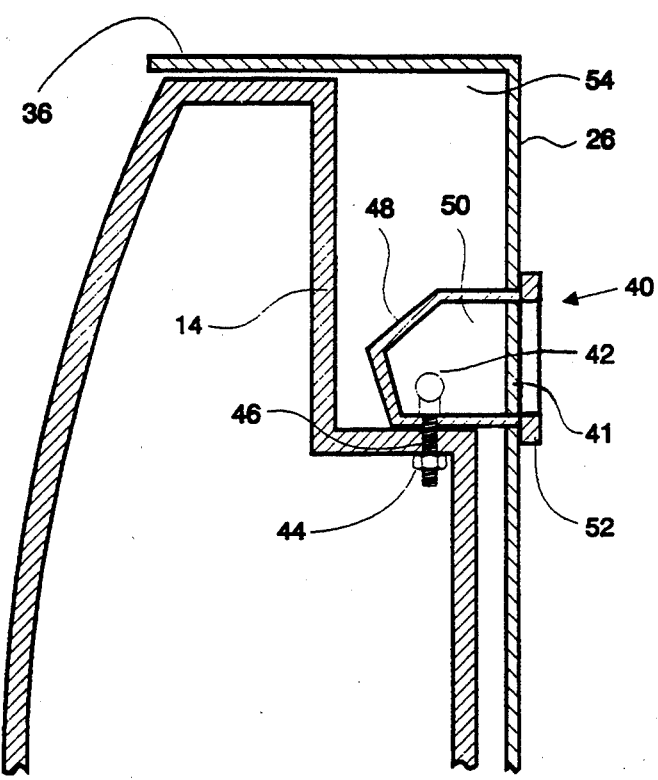
FIG. 2 shows a partial cross-sectional view of the embodiment of the fastener enclosure of FIG. 1 at line 2—2.

FIG. 2 shows a partial cross-sectional view of the embodiment of the tie-down fastener enclosure of FIG. 1 at line 2—2. Specifically, first liner side wall 26 is disposed in relation to first cargo bed side wall 14 such that gap 54 results therebetween. Attached to first cargo bed side wall 14 is fastener 42 which, in this embodiment, includes bolt 46 extending through first cargo bed side wall 14 and nut 44 into which bolt 46 is threaded. Nut 44 is affixed to first cargo bed side wall 14 such that bolt 46 may be removed and reinserted into nut 44. When enclosure 40 is not in place, the exposed portion of fastener 42 resides within gap 54 formed between first cargo bed side wall 14 and first liner side wall 26.

Inserted through hole 41 of first liner side wall 26 is one embodiment of a tie-down fastener enclosure according to the present invention. Enclosure 40 includes casing 48 having an open portion 50. Casing 48 also has at least one aperture therethrough for receipt of fastener 42 (see FIGS. 4-5). Casing 48 is sized for insertion through hole 41. When inserted, open portion 50 is substantially coincident with hole 41 such that access is provided to fastener 42 through open portion 50 of casing 48. Enclosure 40 also includes flanged portion 52 connected to casing 48 adjacent open portion 50 of casing 48. Flanged portion 52 also includes an opening (see FIGS. 3-5) providing access to open portion 50 of casing 48 therethrough. As is explained in greater detail below, once enclosure 40 is installed in hole 41 of first liner side wall 26, fastener 42 extends through casing 48 into open portion 50 of casing 48, flanged portion 52 of enclosure 40 is substantially flush with first liner side wall 26, and casing 48 resides within gap 54 defined by first cargo bed side wall 14 and first liner side wall 26. In this manner, access is provided to fastener 42 through enclosure 40. Further, because flanged portion 52 is substantially flush with first liner side wall 26, enclosure 40 limits or eliminates the potential for water or contaminants to leak into gap 54 to thereby damage first cargo side wall 14 by either moisture damage or by chemical reactions of such contaminants with the surface of first cargo bed side wall 14.

It will be appreciated by those of skill in the art that the gap formed between the cargo bed wall and the liner may be the result of a recess formed in the cargo wall as shown in FIG. 2, or the gap may be the result of a formation in the liner. Either arrangement is anticipated to be within the scope of the present invention as it only necessary that there be sufficient space between the liner wall and the cargo bed wall for receipt of the casing of the enclosure.

It will also be appreciated that the tie-down fastener for which enclosure 40 is utilized may reside on any surface of the cargo bed liner. It is possible and contemplated to be within the scope of the present invention that the tie-down fastener be located at a junction between two walls of the cargo bed. For example, referring to FIG. 1, a tie-down fastener may extend from the corner joining first cargo bed wall 14 and front cargo bed wall 18. Also, fastener 42 need not extend above a horizontal bed surface as is illustrated in FIG. 2. Fastener 42 may extend, for example, perpendicular to the liner surface. To accommodate the location and orientation of fastener 42, the aperture of enclosure 40 is properly located on casing 48 for receipt of fastener 42 therethrough when enclosure 40 is inserted through hole 41 of first liner side wall 26.

In addition to allowing the use of a cargo bed liner which provides access to tie-down fasteners attached to the cargo bed, it will be appreciated by those of skill in the art that the receipt of fastener 42 through enclosure 40 also assists in holding first liner side wall 26 in its position relative to first cargo bed side wall 14. As a result, it is feasible to eliminate the requirement of a retainer proximate the fastener for use in holding first liner side wall 26 in position relative to first cargo bed side wall 14. Further, should a sufficient number of tie-down fasteners and enclosures therefor be utilized, it may not be necessary to use retainers for holding any portion of the liner to the cargo bed. Thus, manufacturing costs and subsequent cost to the consumer are reduced through the implementation of the tie-down fastener enclosure according to the present invention.

Figure 3:
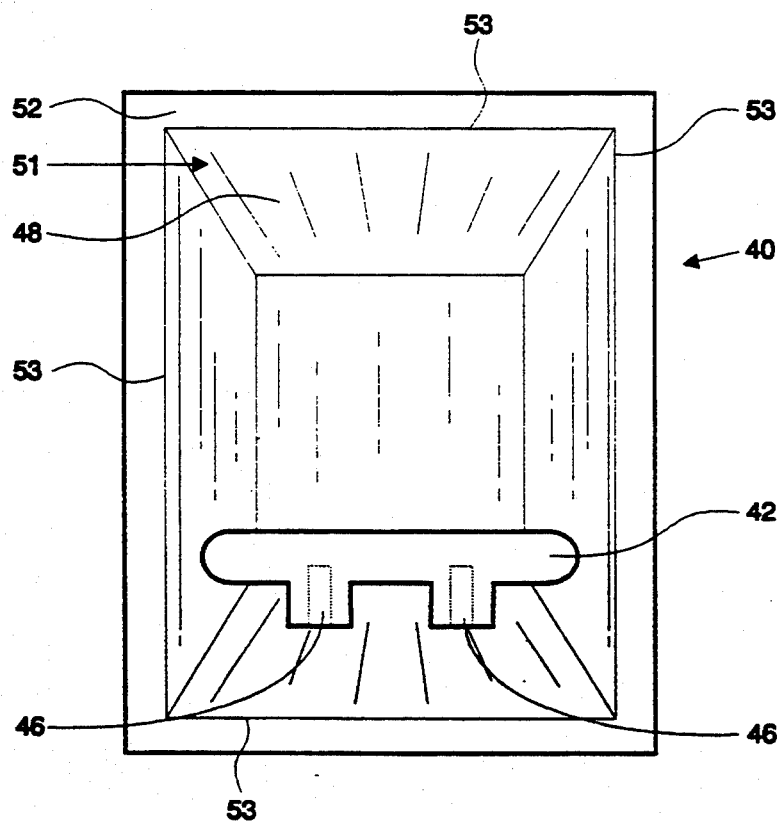
FIG. 3 shows a front view of one embodiment of the tie-down enclosure of the present invention through which a cleat attached to a cargo bed extends.
Figure 4:
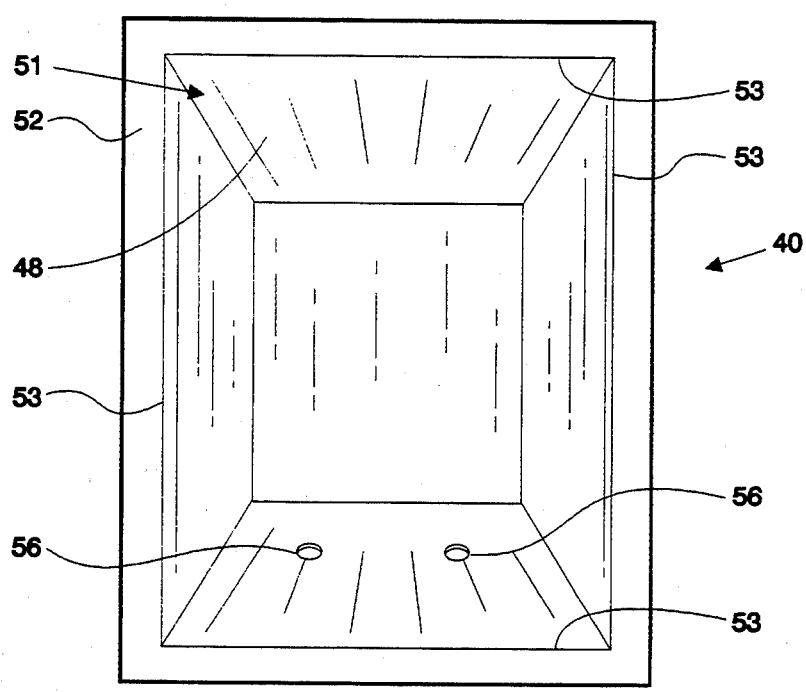
FIG. 4 shows a front view of the embodiment of FIG. 3 without the cleat extending through the enclosure.

Referring to FIG. 3, there is shown a front view of one embodiment of the tie-down fastener enclosure of the present invention through which a cleat attached to a cargo bed extends. In the embodiment shown, casing 48 and flanged portion 52 are comprised of ABS plastic and are of unitary construction. However, it is feasible that different materials may be used or that casing 48 and flanged portion 52 may be formed as separate pieces and then adhered to each other in ways well-known in the art, and such construction is contemplated to be within the scope of the invention. Flanged portion 52 includes opening 51 which, in this embodiment, is defined by inner peripheral edge 53 of flanged portion 52. Thus, when flanged portion 52 is connected to casing 48 adjacent open portion 50 of casing 48, opening 51 is substantially coincident with open portion 50 of casing 48 and the hole in the liner wall. Fastener 42 in the embodiment of FIG. 3 comprises a cleat. Extending from cleat 42 are bolts 46. As shown in FIG. 4 wherein cleat 42 has been removed from enclosure 40, casing 48 of enclosure 40 includes holes 56 serving as apertures through which bolts 46 of cleat 42 may be inserted. In this embodiment, bolts 46 are threaded into cleat 42 as shown.

To install enclosure 40 such that access is provided to cleat 42, before first liner bed side wall 26 is installed, cleat 42 is removed from first cargo bed wall 14 by unscrewing bolts 46 from nuts 44. First liner side wall 26 is then placed in position to substantially cover first cargo bed side wall 14, leaving gap 54 therebetween. If first liner side wall 26 is not precut or preformed to include hole 41, hole 41 is cut into first liner side wall 26 such that hole 41 provides access to the point along first cargo bed side wall 14 from which fastener 42 was removed. Enclosure 40 is then inserted through hole 41 such that holes 56 of casing 48 align with the holes in first cargo bed side wall 14 through which bolts 46 are inserted. Of course, hole 41 of first liner side wall 26 should be properly located and sized such that when enclosure 40 is in this position casing 48 resides within gap 54 and flanged portion 52 is substantially flush with first liner side wall 26 and the periphery of liner hole 41. After enclosure 40 is properly aligned, cleat 42 is refastened to first cargo bed side wall 14 by screwing bolts 46 into nuts 44.

Though cleat 42 having two bolts 46 extending therefrom is illustrated in FIG. 3, other removable tie-down fasteners, such as clamps, eye bolts, rings, and the like are contemplated to be within the scope of the invention.

Figure 5:
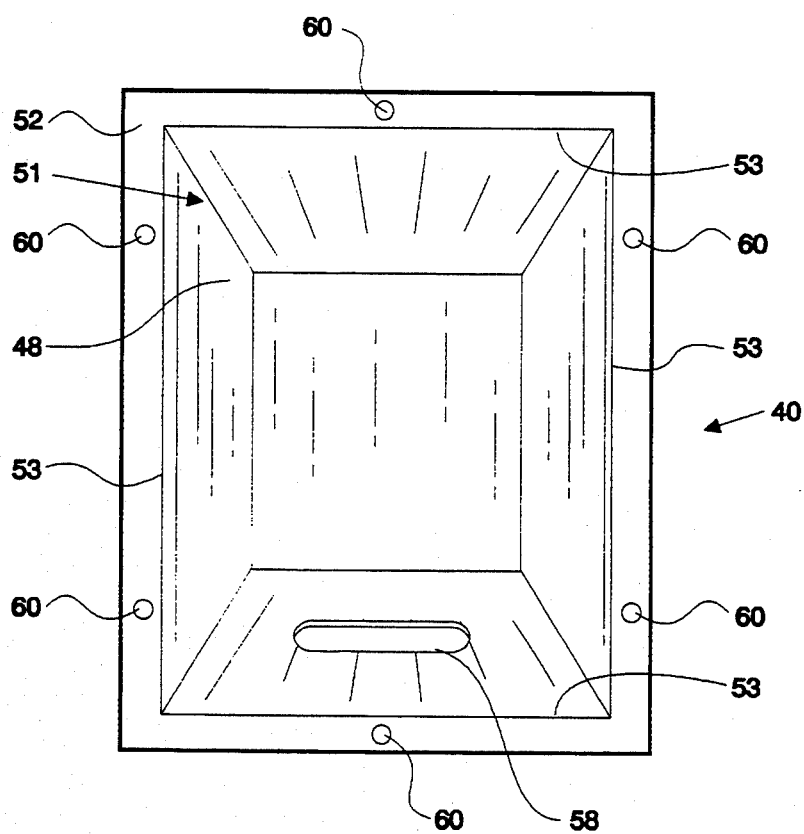
FIG. 5 shows a front view of another embodiment of the tie-down fastener enclosure of the present invention in which the opening of the enclosure is a slot.

Referring now to FIG. 5, there is shown a front view of another embodiment of the tie-down fastener enclosure of the present invention in which the opening of the enclosure is a slot. In this embodiment, the aperture of casing 48 adapted to receive a tie-down fastener comprises slot 58. In this manner should tie-down fastener 42 be permanently attached to the cargo bed as may be the case if the fastener is, for example, welded to the cargo bed, enclosure 40 may still be utilized. Specifically, slot 58 of casing 48 may simply be slid over the top of tie-down fastener 42 during installation of enclosure 40. For this embodiment, to further assist in preventing moisture from entering the gap between the liner and the cargo bed, it may be desired to utilize a seal or washer about fastener 42 at slot 58.

Though the embodiment of FIG. 5 serves the purpose of providing access to a fastener connected to the cargo bed and offers the advantages of the enclosure as discussed herein, it may be desired to provide an additional means for securing the enclosure to the liner. In this embodiment, rivets 60 are provided to serve as a means for attaching enclosure 40 to cargo bed liner. Rivets 60 extend through flanged portion 52 of enclosure 40 as well as through the portion of the cargo bed liner through which enclosure 40 is inserted.

It will be appreciated that other means for fastening enclosure 40 to the cargo bed liner may be utilized. Various fastening means well known in the art, such as adhesives, are contemplated as within the scope of the present invention. Also, if desired, a seal may be placed between flanged portion 52 and that portion of the liner wall to which flanged portion 52 is substantially flush. Such a seal may be desired, for example, to further prohibit the passage of moisture or contaminants through the liner to the gap between the liner and the cargo bed. Further, the aperture(s) of the enclosure, such as holes 56 illustrated in FIG. 4 and slot 58 illustrated in FIG. 5, may be similarly sealed with washers or other materials well known in the art.

While this invention has been described as having a preferred design, the present invention can be further modified within the spirit and s scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In combination, a vehicle cargo bed having a wall and a fastener attached to the wall, and a cargo bed liner having a wall for substantially covering the wall of the cargo bed, the liner wall having a hole therein and adapted to be aligned relative to the cargo bed wall such that the fastener is accessible through the hole in the liner wall, the improvement comprising:

an enclosure for .providing access to the fastener on the cargo bed wall, the enclosure comprising a casing sized for insertion through the hole in the liner wall, said casing having an open portion substantially coincident with the hole in the liner wall when said casing is inserted through the hole, said casing further including at least one aperture therethrough of a size sufficient to permit said casing to be placed over said fastener; and a flanged portion forming an opening, said flanged portion connected to said casing adjacent said open portion such that said opening of said flanged portion is substantially coincident with said open portion of said casing and said hole in said liner wall.

2. The combination defined in claim 1, wherein said flanged portion of said enclosure is situated substantially flush with the liner wall when the enclosure is inserted through the hole to provide access to the fastener.

3. The combination defined in claim 1, wherein said flanged portion of said enclosure includes an inner peripheral edge defining said opening of the flanged portion and wherein said flanged portion is connected to said casing at said inner peripheral edge of said flanged portion.

4. The combination defined in claim 1, further comprising a means for fastening said flanged portion Of said enclosure to the liner wall.

5. The combination defined in claim 4, wherein said fastening means comprises an adhesive placed between said flanged portion and the liner wall.

6. The combination defined in claim 4, wherein said fastening means comprises rivets extending through said flanged portion and the liner wall.

7. The combination defined in claim 1, wherein said enclosure is made of plastic.

8. The combination defined in claim 1, wherein said casing and said flanged portion of said enclosure are of unitary construction.

9. The combination defined in claim 1, wherein said at least one aperture of said casing comprises a slot through which the fastener extends.

10. The combination defined in claim 1, wherein said fastener includes a bolt engaging the cargo bed wall and said at least one aperture in said casing comprises a hole through which said bolt extends.

* * * * *